March 7, 1961

F. J. DISNEY 2,973,974

FLEXIBLE SLEEVE HAVING NUT MEANS THEREIN
FOR CONNECTING HOSE PIPES TO TAPS
OR THE LIKE

Filed April 24, 1959

INVENTOR
Francis John Disney
By
Watson, Cole, Grindle & Watson
ATTORNEYS

United States Patent Office 2,973,974
Patented Mar. 7, 1961

2,973,974
FLEXIBLE SLEEVE HAVING NUT MEANS THEREIN FOR CONNECTING HOSE PIPES TO TAPS OR THE LIKE

Francis John Disney, Haddenham, England, assignor to Airtech Limited, Haddenham, England, a British company Filed Apr. 24, 1959, Ser. No. 808,755

Claims priority, application Great Britain Mar. 10, 1959

3 Claims. (Cl. 285—8)

This invention provides a device for connecting a hose pipe to a tap or the like, which includes a tap connector and a hose connector which is capable of being detachably secured to the tap connector to form a one-piece fitting, the tap connector comprising a unitary moulding of rubber or like flexible material consisting of spaced inner and outer skirts joined together at the end of the moulding which is fitted to the tap, and an adjustable clamping band fitted around the outer skirt.

When the inner skirt is fitted to the tap, the fluid under pressure emerging from the tap enters the space between the skirts. The pressure is contained by the clamping band and accordingly causes the inner skirt to exert a firm grip upon the tap.

Preferably the outer skirt is formed with a series of longitudinal ribs which serve to maintain the skirts spaced apart to a sufficient extent even if the clamping band is tightened to an excessive extent. The ribs conveniently also coact with notches in a nut to which the hose connector is screwed to prevent rotation of the nut in relation to the tap connector.

The device according to the invention can be fitted to taps for the delivery either of liquids or gases.

One embodiment of the invention will now be described in more detail, by way of example, with reference to the accompanying drawing, in which.

Figure 1:
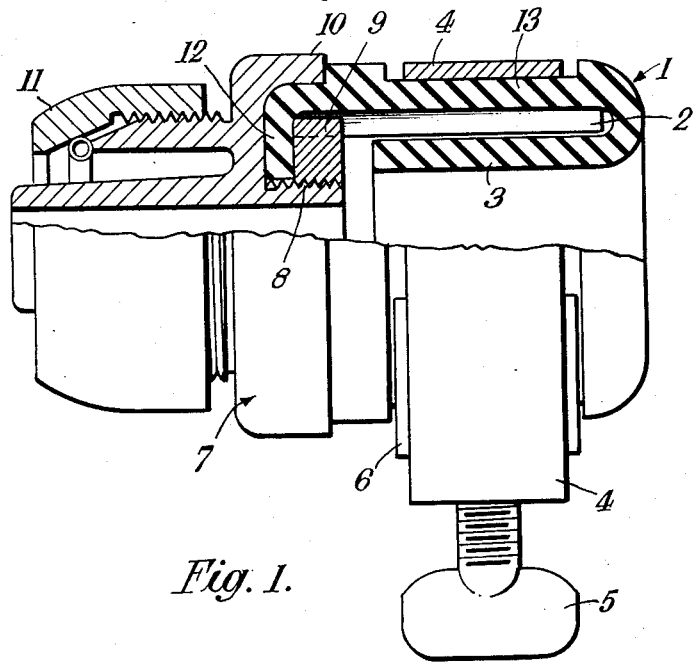
Fig. 1 is a side elevation of the device, partly in section.
Figure 2:
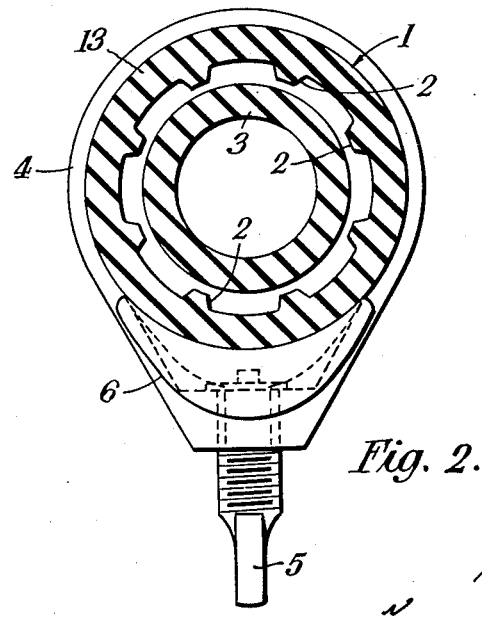
Fig. 2 is a cross section.

The tap connector 1, which can accept taps of round or oval cross section over a range of sizes is constituted by a one-piece rubber moulding including an inner skirt 3 to fit over the tap and an outer skirt 13 having on its inner surface a number of axially extending ribs 2. Around the outer skirt is a clamping band 4, provided with an adjusting screw 5 and a resilient saddle 6. The fluid from the tap has free access to the space between the skirts 3, 13 and the pressure thereof, being contained by the band 4, presses the inner skirt firmly against the tap. The ribs 2 maintain the skirts sufficiently spaced apart even though the band 4 may be over-tight.

The hose connector 7, which has a threaded spigot 8, is screwed into a nut 9 in the tap connector, the nut 9 having notches which are engaged by the ribs 2 so that the nut cannot turn in the tap connector. The nut is retained in position by an inturned lip 12 on the tap connector and an outer lip 10 on the hose connector restricts outward pressure on the lip 12 and provides a seal between the hose connector and the tap connector.

The end portion 11 of the hose connector is of the construction described in British specification No. 714,028, but if preferred the hose connector may have a plain spigot end to fit into the hose.

What I claim as my invention and desire to secure by Letters Patent is:

1. A device for connecting a hose pipe to a tap or the like, said device including a moulded rubber tap connector including an inner skirt to fit over the tap and an outer skirt joined at one end of said connector to said inner skirt and extending coaxially therewith, said outer skirt having on its inner surface a plurality of longitudinally extending ribs and extending beyond the inner skirt at the other end of the connector, a notched nut mounted within said outer skirt with its notches engaged with said ribs and in a position aligned with said inner skirt, and a hose connector having a spigot end screwed into said nut.

2. A device as claimed in claim 1, wherein said outer skirt has at its end an inturned lip retaining said nut in position in the tap connector and said hose connector has a lip engaging the lip on the skirt to provide a seal between the hose connector and the tap connector.

3. A device for connecting a hose pipe to a tap or the like, said device comprising a unitary connector of flexible material including an inner skirt to fit over the tap and an outer skirt joined at one end of said connector to said inner skirt and extending coaxially therewith, said outer skirt having on its inner surface a plurality of longitudinally extending ribs and extending beyond the inner skirt at the other end of the connector, a notched nut mounted within said outer skirt with its notches engaged with said ribs and in a position aligned with said inner skirt, said outer skirt having a formation for retaining said nut in position thereon.

References Cited in the file of this patent

UNITED STATES PATENTS

| | | |
|---|---|---|
| 1,473,537 | Bailey | Nov. 6, 1923 |
| 2,274,257 | Rockwood | Feb. 24, 1942 |
| 2,304,114 | Moore | Dec. 8, 1942 |